United States Patent
Modica et al.

(10) Patent No.: US 8,032,763 B2
(45) Date of Patent: Oct. 4, 2011

(54) MULTI-NETWORK CRYPTOGRAPHIC DEVICE

(75) Inventors: John A. Modica, Sewell, NJ (US); Kenneth White, Yardley, PA (US)

(73) Assignee: L3 Communications Corporation, New York, NY (US)

(*) Notice: Subject to any disclaimer, the term of this patent is extended or adjusted under 35 U.S.C. 154(b) by 798 days.

(21) Appl. No.: 11/777,363

(22) Filed: Jul. 13, 2007

(65) Prior Publication Data
US 2008/0189556 A1    Aug. 7, 2008

Related U.S. Application Data

(60) Provisional application No. 60/899,957, filed on Feb. 7, 2007.

(51) Int. Cl.
*H04L 29/06* (2006.01)
*G08C 15/00* (2006.01)

(52) U.S. Cl. ........ 713/192; 713/151; 380/255; 370/235; 370/252; 370/392

(58) Field of Classification Search .................. None
See application file for complete search history.

(56) References Cited

U.S. PATENT DOCUMENTS

| | | | |
|---|---|---|---|
| 5,655,148 A * | 8/1997 | Richman et al. ............ | 710/8 |
| 2002/0162026 A1 | 10/2002 | Neuman et al. | |
| 2003/0093591 A1* | 5/2003 | Hohl ............................ | 710/22 |
| 2003/0172219 A1* | 9/2003 | Yao ............................. | 710/305 |

FOREIGN PATENT DOCUMENTS

| WO | WO 9807255 | 2/1998 |
|---|---|---|
| WO | WO 0056000 | 9/2000 |

OTHER PUBLICATIONS

Hawk, J., "Wireless Warriors Secure in Their Knowledge", *SIGNAL Magazine*, 2005, http://www.afcea.org, 4 pages.
Harris® Assured Communications™, "Secure Wireless Local Area Network", SecNet® Plus PC Card, 2006, 2 pages.

* cited by examiner

*Primary Examiner* — Kaveh Abrishamkar
(74) *Attorney, Agent, or Firm* — Condo Roccia LLP

(57) ABSTRACT

A Personal Computer Memory Card International Association (PCMCIA) card is disclosed. The PCMCIA card may include a cryptographic module, a communications interface, and a processor. The cryptographic module may perform Type 1 encryption of data received from a computer into which the card is inserted. The cryptographic module may support High Assurance Internet Protocol Encryption (HAIPE). The communications interface may provide connectivity to a network adapter. The communications interface may include a Universal Serial Bus (USB) interface. The processor may detect whether a network adapter is coupled to the communications interface, identify a device driver that corresponds to the network adapter, and employ the device driver to provide operative communication between the cryptographic module and the network adapter. The PCMCIA card may contain a datastore that maintains a plurality device drivers. For example, the plurality of device drivers support any one of IEEE 802.x, Ethernet, V.90, or RS-232 network protocols.

19 Claims, 4 Drawing Sheets

MULTI-NETWORK CRYPTOGRAPHIC DEVICE

CROSS-REFERENCE TO RELATED APPLICATIONS

This non-provisional application for patent claims priority to U.S. provisional patent application No. 60/899,957 entitled "Method for Utilizing COTS Devices with Cryptographic Equipment" filed on Feb. 7, 2007 which is herein incorporated by reference in its entirety.

GOVERNMENT SUPPORT

The present invention was supported by the National Security Agency under Contract Numbers MDA-904-02-C-1152 and CCEP-056-04. The government may have certain rights in the invention.

BACKGROUND

Information systems that deal in sensitive information may require high levels of security. When users of a secure information system are co-located with that system, the users may connect directly to the system in a secure environment. On the other hand, when the users are remote to secure information systems, it may be necessary to establish a secure, encrypted communications channel between the user and information system. For example, a U.S. government employee may wish to connect to a classified information system via a laptop computer and a public access network such as a Wi-Fi hotspot. Establishing such a connection may require a high level of security between the computer and the information system to protect the classified data as it traverses the non-secure public network.

To establish the secure, encrypted communication channel between the user and the information system over a public network, the user may employ a Type 1 device. Type 1 products are devices or systems that are certified by the National Security Agency for use in cryptographically securing classified U.S. government information. Generally, Type 1 designation may be reserved for products that have been analyzed and tested for cryptographic security, tamper resistance, mission security, and the like. The Type 1 device may be placed between the user's computer and the non-secure public network over which the user wishes to establish a secure communication channel. The Type 1 device may include the cryptographic algorithms required to establish a secure connection over the public network.

Often, the user may not know ahead of time which public networks and which physical access options may be available. For example, the user may be staying in a hotel that offers public Internet access, but the user may not know ahead of time whether that access is available via wireless local area network (WLAN), Ethernet, dial-up modem, or the like. To be assured of connectivity, the user may have to provide many different Type 1 products, one for each physical access option that is likely to be available. Also, because Type 1 encryption may be processing intensive, the form factor of each Type 1 device may be bulky, heavy, and require external power sources. Thus, there is a need for a Type 1 encryption device that is compact and supports access to multiple networks.

SUMMARY

A Personal Computer Memory Card International Association (PCMCIA) card is disclosed. The PCMCIA card may include a cryptographic module, a communications interface, and a processor. The PCMCIA card may have a PCMCIA Type II form factor.

The cryptographic module may perform Type 1 encryption of data received from a computer into which the card is inserted. The cryptographic module may support High Assurance Internet Protocol Encryption (HAIPE).

The communications interface may provide connectivity to a network adapter. The communications interface may include a Universal Serial Bus (USB) interface. The USB interface may include a mini-USB port. The communications interface may provide power to the network adapter.

The processor may detect whether a network adapter is coupled to the communications interface. The processor may identify a device driver that corresponds to the network adapter. The processor may employ the device driver to provide operative communication between the cryptographic module and the network adapter. If a corresponding device driver is not found, the USB interface may switch off power to the network adapter.

The PCMCIA card may contain a datastore that maintains a plurality of device drivers. The plurality of device drivers may support a plurality of network protocols. For example, the plurality of device drivers may support any one of Institute of Electrical and Electronics Engineers (IEEE) 802.x, Ethernet, V.90, or RS-232 network protocols.

DETAILED DESCRIPTION

Figure 1:
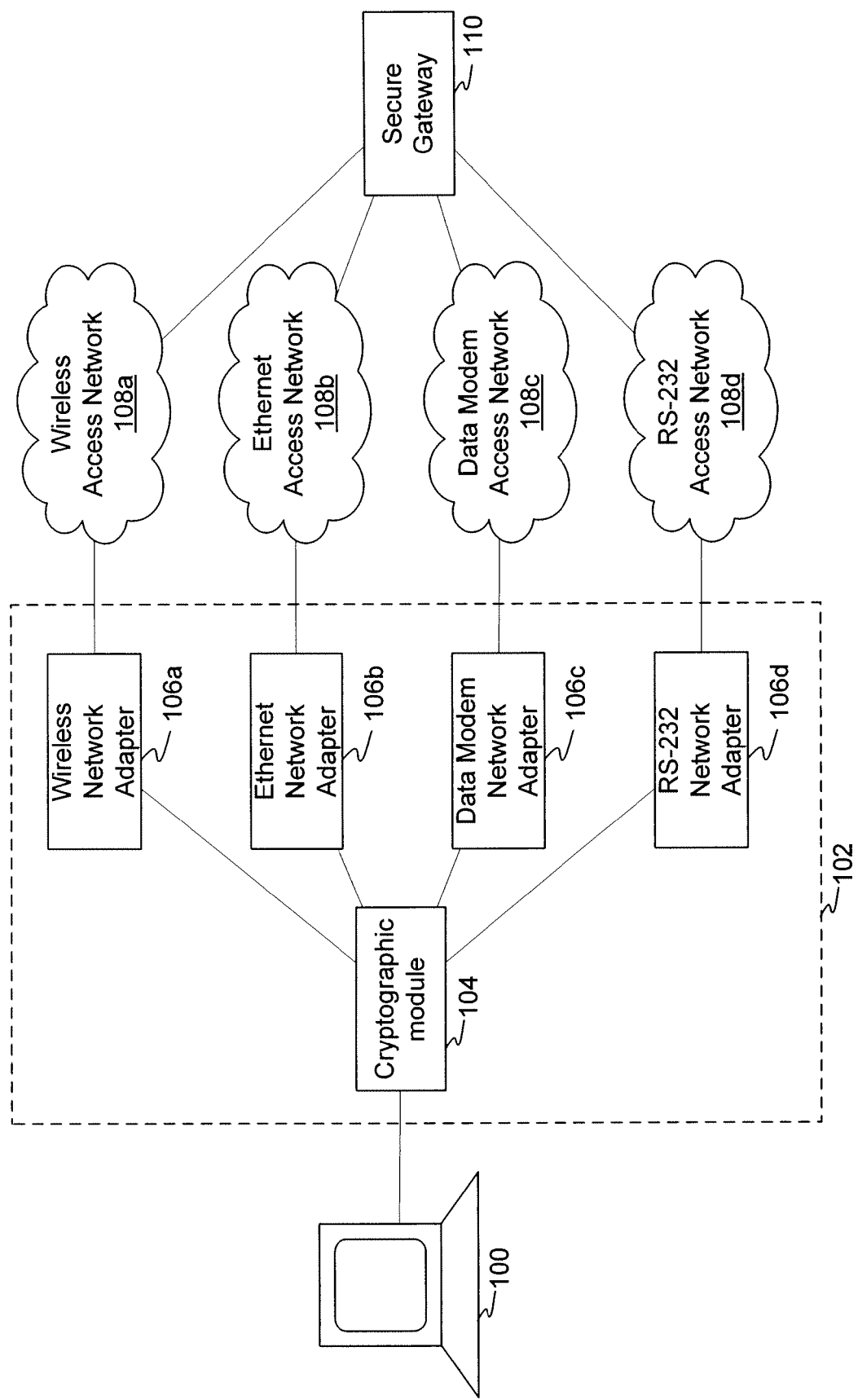
FIG. 1 depicts an example cryptographic device.

FIG. 1 depicts an example cryptographic device 102 that may be used to connect a computer 100 to a secure gateway 110. The computer 100 may be any computing device such as a personal computer, laptop, notebook computer, tablet computer, handheld computer, personal digital assistant, and the like. The computer 100 may include an interface for receiving a cryptographic device 102. For example, the computer 100 may include a Personal Computer Memory Card International Association (PCMCIA) slot for receiving a PCMCIA card. For example, the PCMCIA slot may be a Type I, Type II, Type III, or Type IV slot. The computer 100 may support CardBus slots, CardBay slots, ExpressCard slots, and the like. The computer 100 may include a peripheral interface such as Universal Serial Bus (USB), RS-232, Institute of Electrical and Electronics Engineers (IEEE) 1394, and the like.

The cryptographic device 102 may connect to the computer 100. The cryptographic device 102 may include a cryptographic module 104 and a plurality of network adapters 106a-d. The form factor of the cryptographic device 102 may be suitable for connecting to the computer 100. For example, the form factor may be a PCMCIA form factor. The cryptographic device 102 may be a Type II PCMCIA card.

The cryptographic device 102 may include a tactical enclosure. For example, the cryptographic device 102 may conform to military environmental specifications, such as NEMA4, IP-67, MIL-STD-810F, MIL-STD-461E, SAE, and the like. The cryptographic device 102 may be powered by the computer 100.

The cryptographic device 102 may be a host-based encryptor, capable of securely transmitting and receiving voice, data, and Internet Protocol (IP) datagrams. The cryptographic device 102 may support circuit-switched voice, data, and fax connections from the secure gateway 110. The cryptographic module 104 may establish a secure communication channel between the computer 100 and the secure gateway 110.

The cryptographic module 104 may support encrypting data sent from the computer 100 to the secure gateway 110 and decrypting data sent from the secure gateway 110 to the computer 100. The cryptographic module 104 may include any system, subsystem, circuit, processor, or computing component that provides cryptographic functionality. Cryptographic functionality may include key generation, key exchange, encrypting data, decrypting data, and the like. For example, the cryptographic module 104 may support Type 1 encryption. Type 1 encryption may include any classified or controlled cryptographic algorithm endorsed by the National Security Agency (NSA) for securing classified and sensitive U.S. Government information. The Type 1 designation may refer to products that contain approved NSA algorithms. For example, Type 1 algorithms may include Accordian, Firefly, Medley, Saville, Walburn, and the like. The cryptographic module may provide NSA Type 1 High-Grade/High Assurance, while protecting classified information up to the Top Secret/Sensitive Compartmented Information (TS/SCI) level.

The cryptographic module 104 may support secure communication protocols to facilitate the secure connection between the cryptographic module 104 and the secure gateway 110. For example, the cryptographic module 104 may support High Assurance Internet Protocol (HAIPE). Also for example, the cryptographic module 104 may support The Secure Communications Interoperability Protocol (SCIP), Future Narrow-Band Digital Terminal (FNBDT), Internet Protocol Security (IPSec), and the like.

Likewise, the secure gateway 110 may support complementary cryptographic algorithms and complementary secure communication protocols to enable secure communication between the cryptographic device 102 and the secure gateway 110. For example, the secure gateway 110 may terminate a Virtual Private Network (VPN) connection to enable the computer 100 to access and information system protected by the secure gateway 110. For example, the secure gateway 110 may be a RedEagle™ KG-240/245 in-line network encryptor (L3 Communication Systems, New York, N.Y.).

To establish an Internet Protocol (IP) connection, a user at the computer 100 may use host software to access the cryptographic device 102 with a pass phrase. The cryptographic device 102 may establish a Security Association (SA) with the secure gateway 110. Identification and authentication information may be exchanged to establish an encrypted session. Once the SA is established, continuous encryption/decryption and data integrity services may be provided by the cryptographic device 102 until the session is terminated.

To establish a circuit-switched connection, the user at the computer 100 may use host software to access the cryptographic device 102 with a pass phrase. The user may dial or speed-dial the desired remote phone number, and the cryptographic device 102 may negotiate a secure SCIP connection with the secure gateway 110. The cryptographic device 102 may establish a secure connection with another cryptographic device 102. If negotiation is successful, the user may be prompted to accept the connection.

The cryptographic module 104 may communicate with a plurality of network adapters 106a-d. The network adapters 106a-d may connect the cryptographic module 104 to a plurality of access networks. The access networks may include IP networks. The network adapters 106a-d may include any hardware suitable for providing connectivity with an access network 108a-d. For example, the plurality of network adapters 106a-d may include a wireless network adapter 106a, an Ethernet network adapter 106b, a data modem network adapter 106c, and the RS-232 network adapter 106d, and the like.

The wireless network adapter 106a may include the hardware and software suitable for communicating over a wireless access network 108a. The wireless network adapter 106a may support IEEE 802.11x wireless protocols, such as 802.11a, 802.11b, 802.11g, 802.11n, and the like. The wireless network adapter 106a may support mobile communications protocols such as, Cellular Digital Packet Data (CDPD), Global System for Mobile Communications (GSM), General Packet Radio Service (GPRS), Wideband Code Division Multiple Access (W-CDMA), Worldwide Interoperability for Microwave Access (WiMax), and the like.

The Ethernet network adapter 106b may include the hardware and firmware suitable for communicating over an Ethernet access network 108b. For example, the Ethernet network adapter 106b may support Fast Ethernet, Gigabit Ethernet, 10 Gigabit Ethernet, 1000 Gigabit Ethernet, and the like. The Ethernet network adapter 106b may support any suitable physical connector and medium. For example, the Ethernet network adapter 106b may support 10Base2, 10Base-T, 10Base-TX, and the like. The Ethernet network adapter 106b may include a T568A/B wired 8P8C modular connector.

The data modem network adapter 106c may include the hardware suitable for connecting and communicating data over the public switched telephone network. The data modem may conform to V.x standards, such as V.32, V.34, V.70, V.90, V.92, and the like.

The RS-232 network adapter 106d may include the hardware suitable for connecting and communicating data over a serial connection. The RS-232 network adapter 106d may include a 3-wire and 5-wire RS-232. For example, the RS-232 adapter may include DB-25, DE-9, EIA/TIA 561 pinouts. The RS-232 network adapter 106d may connect to a complementary RS-232 device, for communication to the secure gateway 110. The plurality of network adapters 106a-d may include RS-422 and RS-485 network adapters 106a-d.

The plurality of network adapters 106a-d may be housed commonly with the cryptographic module 104. The user may select or indicate which of the plurality of network adapters 106a-d is to be employed for secure communications. The plurality of network adapters 106a-d may be contained in individual housings separate to that of the cryptographic module 104. Each may connect to the cryptographic module 104 via a communications interface 212 (See FIG. 2). For example, the communications interface 212 may be a USB interface. Some network adapters 106a-d may be housed commonly with the cryptographic module 104 and some may be external to the housing of the cryptographic module 104.

Figure 2:
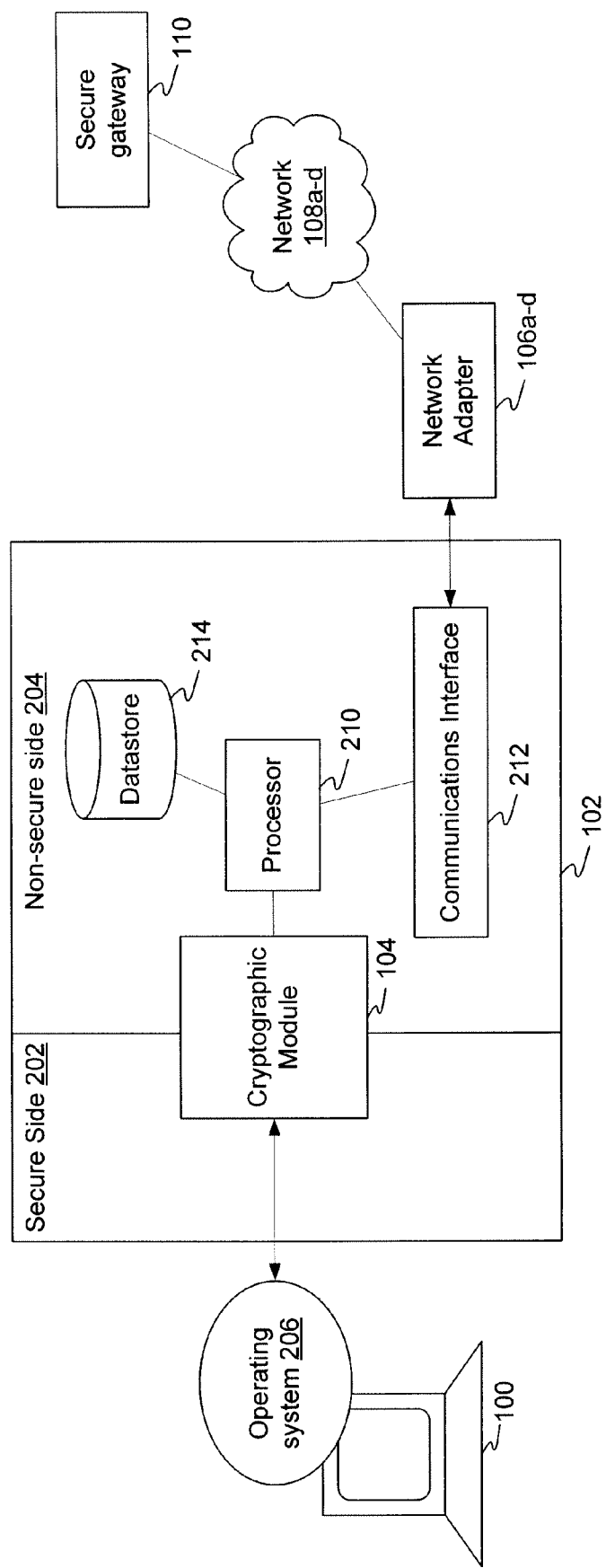
FIG. 2 depicts an example cryptographic device.

Each network adapter 106a-d may have an associated device driver. The device driver may be any software, computer executable code, or instructions that enables the cryptographic device 102 to interact with the respective network adapter 106a-d. The driver may provide an Application Programming Interface (API) for communicating with and controlling the respective network adapter 106a-d. Each respective driver may include code specific to the communications protocols supported by the respective network adapter 106a-d. For example, the driver that supports the wireless adapter may include code that provides infrastructure/ad hoc modes of operation, standard authentication such as Open System, Wired Equivalent Privacy (WEP), Wi-Fi Protected Access (WPA), and the like, frame management, reassembly/fragmentation of wireless data frames, and the like FIG. 2 depicts an example cryptographic device 102 with one network adapter 106a-d engaged. The network adapter 106a-d may provide communication with the secure gateway 110 via a network 108a-d. The network adapter 106a-d may be external to the device and coupled via a physical interface such as a USB interface. The network adapter 106a-d may be internal to the cryptographic device 102 a selected via a logical interface.

The operating system 206 of the computer 100 may communicate with the cryptographic module 104 of the cryptographic device 102. The operating system 206 of the computer 100 may include a device driver associated with the cryptographic device 102. The device driver of the cryptographic device 102 may support configuration and operation of the cryptographic module 104.

The cryptographic module 104 may define a demarcation between a secure side 202 and a non-secure side 204. The cryptographic module 104 may encrypt plain-text data sent from the secure side 202 to cipher-text data sent to the non-secure side 204. Likewise, the cryptographic module 104 may decrypt cipher-text data sent from the non-secure side 204 to plain-text data sent to the secure side 202. The cryptographic module 104 may prevent unencrypted data from passing from the secure side 202 to the non-secure side 204.

In a classified environment, the secure side 202 may be known as the red side, and the non-secure side 204 may be known as the black side. The red designation may apply to systems, devices, areas, circuits, components, equipment, and the like in which unencrypted national security information is being processed. The black designation may apply to systems, devices, areas, circuits, components, equipment, and the like in which national security information is either encrypted or not processed.

The cryptographic device 102 may include a processor 210 in communication with the cryptographic module 104. The processor 210 may include any system, subsystem, or component for digital computing. For example, the processor 210 may include a microprocessor, Application Specific Integrated Circuit (ASIC), Digital Signal Processor (DSP), and the like. The processor 210 may be an Advanced RISC Machine (ARM) processor. The processor 210 may operate a Real-Time Operating System (RTOS). The processor 210 may provide IP processing, IP fragmented packet reassembly, SCIP setup and operation, wireless network configuration, network adapter management, and the like. The processor 210, in conjunction with the RTOS may provide Point-to-Point Protocol (PPP) and Dynamic Host Control Protocol (DHCP) client functionality.

The processor 210 may provide operative communication between the cryptographic module 104 and the network adapter 106a-d. For example, data communicated between the cryptographic module 104 and the network adapter 106a-d may flow directly via the processor 210. Also for example, data communicated between the cryptographic module 104 and the network adapter 106a-d may flow via a bus directly between the cryptographic module 104 and the network adapter 106a-d with the bus controlled by the processor 210.

The cryptographic device 102 may include a datastore 214 in communication with the processor 210. The datastore 214 may be any component, system, or subsystem suitable for storing data. The datastore 214 may be volatile memory such as random access memory (RAM). The datastore 214 may be nonvolatile memory, such as read-only memory (ROM), flash memory, magnetic storage, and the like.

The datastore 214 may include a plurality of device drivers. Each device driver may correspond to a network adapter 106a-d. Each device driver may enable the processor 210 and RTOS to employ the respective network adapter 106a-d. The device driver may be executable code suitable for execution by the processor 210.

The datastore 214 may contain data that identifies each device driver. For example, the datastore 214 may include a lookup table that cross references identification information to each device driver. Also, for example, the datastore 214 may include executable code that logically identifies each device driver according to identification information.

The cryptographic device 102 may include a communications interface 212 in communication with the processor 210. The communications interface 212 may enable data communications between the processor 210 and the network adapter 106a-d. The communications interface 212 may be a logical or physical interface. For example, the communications interface 212 may be a USB interface. The USB interface may support any version, such as 1.0, 1.1, and 2.0. The communications interface 212 may include a USB host controller and a root hub. The communications interface 212 may provide a communications bus that provides a data link between the processor 210 and the network adapter 106a-d.

The communications interface 212 may include any physical connector suitable for transferring data. For example, the connector may include USB type A and type B form connectors. Also for example, the connector may include mini-USB and micro-USB form connectors. When the network adapter 106a-d is engaged, the communications interface 212 may provide power to the network adapter 106a-d. The processor 210 may indicate to the communications interface 212 to discontinue providing power. For example, if an incorrect device is engaged to the communication interface, the processor 210 may indicate to the communications interface 212 to discontinue providing power.

Figure 3:
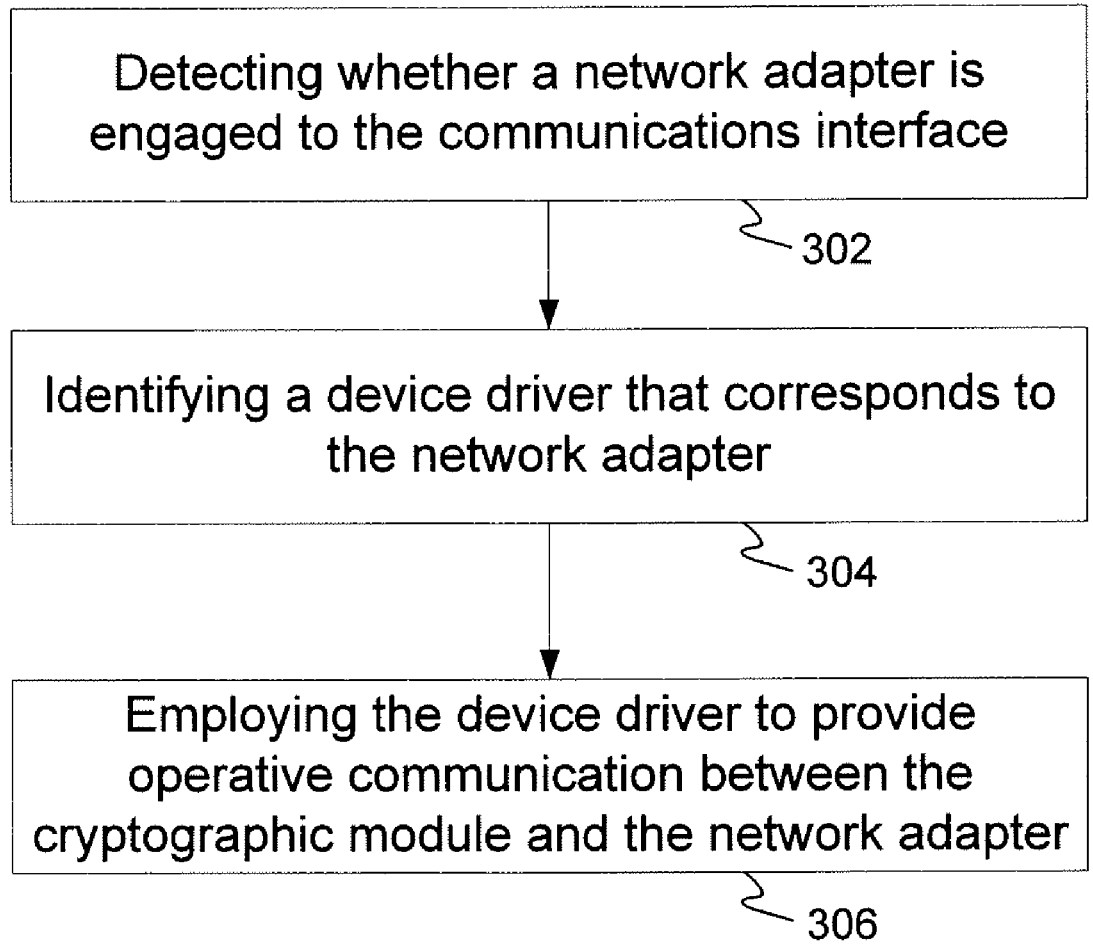
FIG. 3 depicts an example process for employing a device driver.

FIG. 3 depicts an example process for employing a device driver. At 302, the processor 210 may detect that a network adapter 106a-d is engaged to the communications interface 212. Where the network adapter 106a-d is separately housed and connects to the communications interface 212 via USB, the processor 210 may detect that the network adapter 106a-d is engaged once the USB connector of the network adapter 106a-d is coupled to the USB connector of the communications interface 212. Where the network adapter 106a-d is commonly housed and connects to the communications interface 212 logically, the processor 210 may detect that the network adapter 106a-d is engaged once the user selects the network adapter 106a-d.

At 304, the processor 210 may identify a device driver that corresponds to the network adapter 106a-d. The communications interface 212 and the network adapter 106a-d may initialize via a start-up handshaking protocol. The network adapter 106a-d may provide data that uniquely identifies the network adapter 106a-d to the processor 210. For example, the network adapter 106a-d may communicate device descriptors, configuration descriptors, interface descriptors, endpoint descriptors, and string descriptors consistent with the USB interface. Also for example, the device descriptor may include a vendor ID, a product ID, and a device release number that may be used to identify the network adapter 106a-d.

The processor 210 may use this information to identify the device driver that corresponds to the network adapter 106a-d. For example, the processor 210 may logically map the identifying information to a specific device driver. If the identification information does not map to any stored device driver, the processor 210 may indicate to the communications interface 212 to discontinue powering the network adapter 106a-d.

At 306, the processor 210 may employ the corresponding device driver to provide operative communication between the cryptographic module 104 and the network adapter 106a-d. The device driver may include executable code that the processor 210 may execute to control the flow and format of data between the network adapter 106a-d and the cryptographic module 104. The device driver may provide the functionality required to format data according to a network protocol associated with the network adapter 106a-d. The device driver may provide call set-up and tear-down logic for circuit-switched network adapters 106a-d.

Figure 4A:
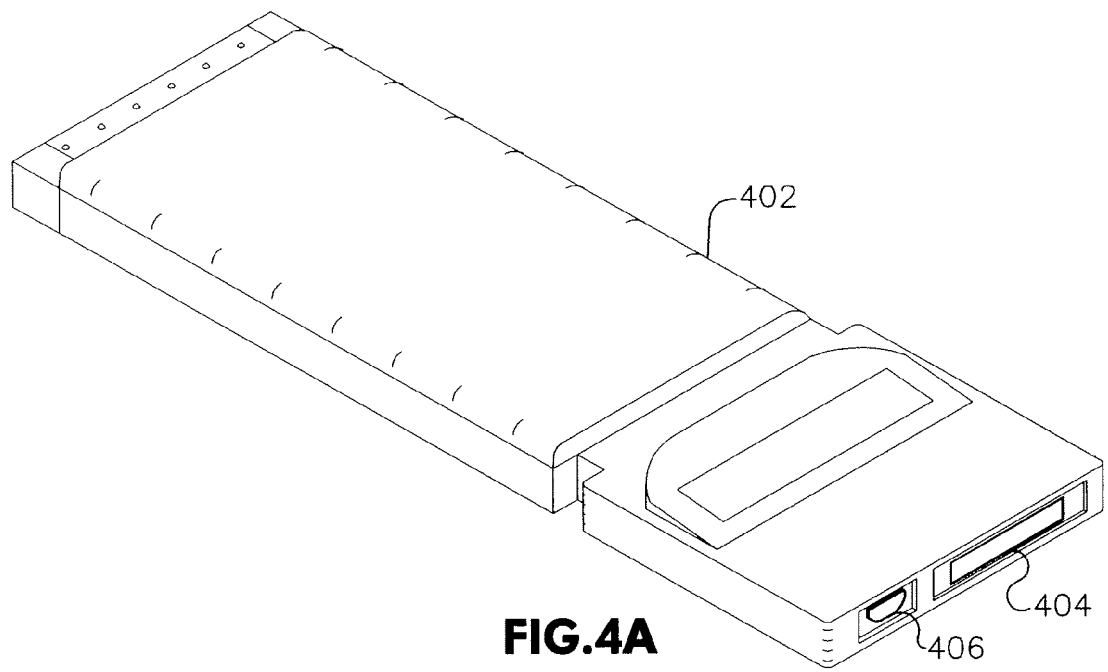
FIGS. 4a-b depict an example Personal Computer Memory Card International Association (PCMCIA) card and example Universal Serial Bus (USB) network adapters.
Figure 4B:
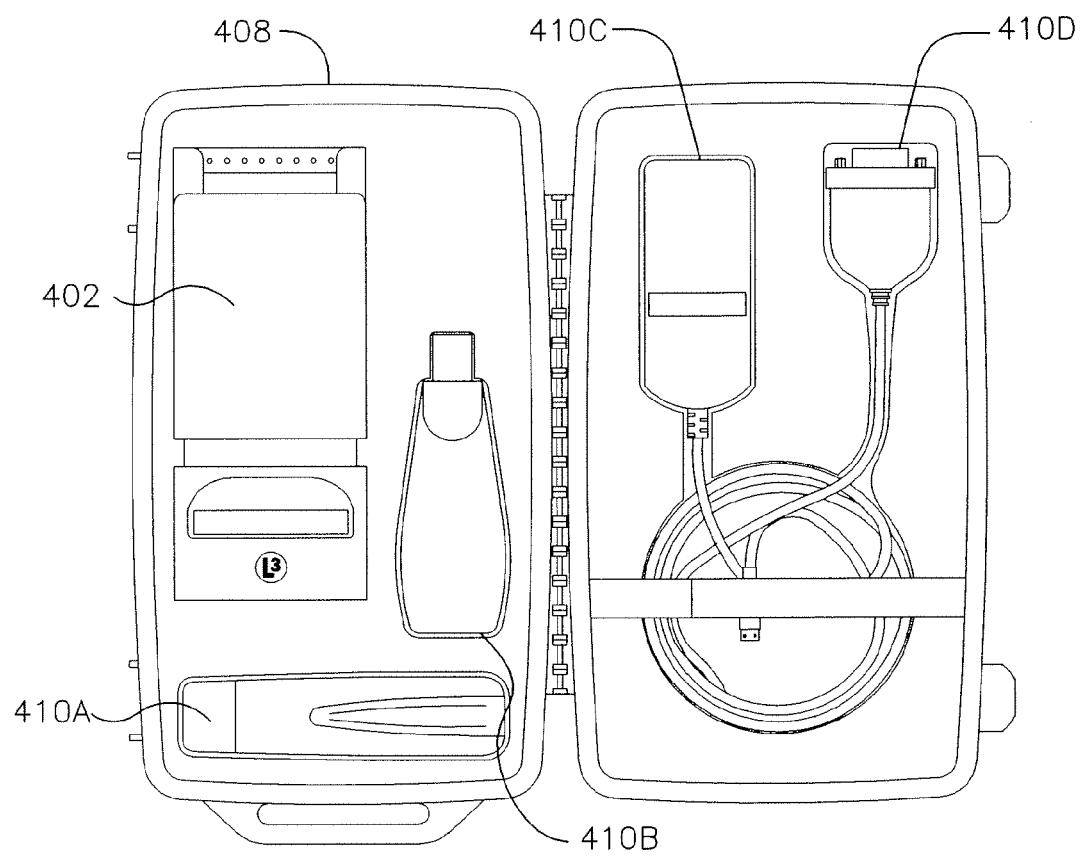

FIGS. 4a-b depict an example Personal Computer Memory Card International Association (PCMCIA) card 402 and example USB network adapters 410a-d. The PCMCIA card 402 may house the cryptographic module 104, processor 210, datastore 214, and communications interface 212. The PCMCIA card may include a Type A USB connector 404 and the mini-USB connector 406.

As shown in FIG. 4b, the PCMCIA card 402 may be packaged with a plurality of selectable USB network adapters 410a-d. Each network adapter 410a-d and the PCMCIA card 402 may be packaged together in a carrying case 408. Each network adapter 410a-d may be separately housed and may be connected to a PCMCIA card 402 via the Type A USB connector 404 and/or the mini-USB connector 406. Each network adapter 410a-d may include a complementary USB connector.

The plurality of network adapters 410a-d may include an 802.11b/g wireless adapter 410a, an Ethernet network adapter 410b, an analog modem 410c, and a RS-232 adapter 410d. The 802.11b/g wireless adapter 410a may be compatible with the IEEE 802.11b and 802.11g standards. The Ethernet network adapter 410b may be compatible with the IEEE 802.3 standard and 10BASE-T cabling. The analog modem 410c may be compatible with the International Telecommunication Union (ITU) V.90 interoperability standard. The RS-232 adapter 410d may be a serial device compatible with the RS-232 serial interface standard.

Each network adapter 410a-d may be selected by inserting the respective USB connector of the network adapter 410a-d into the complementary USB connector of the PCMCIA card 402. The PCMCIA card 402 may be inserted into the PCMCIA slot in the computer 100. Once inserted into the computer 100, the PCMCIA card 402 with the connected network adapter 410a-d may provide the Type 1 cryptography and data connectivity features to the computer 100.

What is claimed:

1. A self-configuring Personal Computer Memory Card International Association (PCMCIA) card, comprising:
    a cryptographic module for performing Type 1 encryption of data received from a computer into which the PCMCIA card is inserted, the cryptographic module defining a secure side and a non-secure side;
    a Universal Serial Bus (USB) interface; and
    a processor, on the non-secure side of the cryptographic module, that detects a type of network adapter coupled to the USB interface, identifies, from a plurality of device drivers, a device driver that corresponds to the type of network adapter, and configures the PCMCIA card by employing the device driver to permit operative communication between the cryptographic module and the type of network adapter coupled to the USB interface.

2. The PCMCIA card of claim 1, wherein the PCMCIA card has a Type II form factor.

3. The PCMCIA card of claim 1, wherein the cryptographic module supports High Assurance Internet Protocol Encryption (HAIPE).

4. The PCMCIA card of claim 1, wherein the USB interface includes a mini-USB port.

5. The PCMCIA card of claim 1, wherein the USB interface switches off power to the network adapter when the corresponding device driver is not found.

6. The PCMCIA card of claim 1, further comprising a datastore that contains a plurality of device drivers.

7. The PCMCIA card of claim 6, wherein the plurality of device drivers support a plurality of network protocols.

8. The PCMCIA card of claim 6, wherein the plurality of device drivers support IEEE 802.x, Ethernet, V.90, or RS-232 network protocols.

9. A self-configuring Personal Computer Memory Card International Association (PCMCIA) card, comprising:
    a tactical enclosure;
    a cryptographic module for performing Type 1 encryption of data received from a computer in to which the PCMCIA card is inserted, the cryptographic module defining a secure side and a non-secure side;
    a Universal Serial Bus (USB) interface; and
    a processor, on the non-secure side of the cryptographic module, that detects a type of network adapter coupled to the USB interface, identifies, from a plurality of device drivers, a device driver that corresponds to the type of network adapter, and configures the PCMCIA card by employing the device driver to permit operative communication between the cryptographic module and the type of network adapter coupled to the USB interface.

10. The device of claim 9, wherein the cryptographic module supports High Assurance Internet Protocol Encryption (HAIPE).

11. The device of claim 9, wherein the USB interface includes a mini-USB port.

12. The device of claim 9, wherein the USB interface switches off power to the network adapter when the corresponding device driver is not found.

13. The device of claim 9, further comprising a datastore that contains a plurality of device drivers.

14. The device of claim 13, wherein the plurality of device drivers support a plurality of network protocols.

15. The device of claim 13, wherein the plurality of device drivers support IEEE 802.x, Ethernet, V.90, or RS-232 network protocols.

16. A self-configuring Personal Computer Memory Card International Association (PCMCIA) card, comprising:
    a cryptographic module for performing encryption of data received from a computer into which the PCMCIA card is inserted, the cryptographic module defining a secure side and a non-secure side;
    a digital communications interface; and
    a processor, on the non-secure side of the cryptographic module, that detects a type of network adapter that is engaged by the communications interface, identifies, from a plurality of device drivers, a device driver that corresponds to the type of network adapter, and configures the PCMCIA card by employing the device driver to permit operative communication between the cryptographic module and the type of network adapter engaged by the communications interface.

17. The PCMCIA card of claim 16, further comprising a plurality of network adapters, wherein the first network adapter is selected from the plurality of network adapters.

18. The PCMCIA card of claim 16, wherein the plurality of network adapters support a plurality of network protocols.

19. The PCMCIA card of claim 16, wherein the plurality of network adapters support IEEE 802.x, Ethernet, V.90, or RS-232 network protocols.

* * * * *